(12) United States Patent
Luo et al.

(10) Patent No.: US 12,465,063 B2
(45) Date of Patent: Nov. 11, 2025

(54) HIGH-CLARITY SOYBEAN FLAVOR PEPTIDE, PREPARATION METHOD THEREFOR, AND USE THEREOF

(71) Applicant: GUANGDONG TIANQI BIOTECHNOLOGY CO., LTD., Guangdong (CN)

(72) Inventors: Yanhua Luo, Foshan (CN); Yuting Wu, Foshan (CN); Letian Tan, Foshan (CN); Jianmin Mai, Foshan (CN); Jun Wu, Foshan (CN); Guowan Su, Foshan (CN)

(73) Assignee: GUANGDONG TIANQI BIOTECHNOLOGY CO., LTD., Guangdong (CN)

( * ) Notice: Subject to any disclaimer, the term of this patent is extended or adjusted under 35 U.S.C. 154(b) by 609 days.

(21) Appl. No.: 17/763,503

(22) PCT Filed: Aug. 4, 2020

(86) PCT No.: PCT/CN2020/106686
§ 371 (c)(1),
(2) Date: Mar. 24, 2022

(87) PCT Pub. No.: WO2021/057266
PCT Pub. Date: Apr. 1, 2021

(65) Prior Publication Data
US 2022/0346407 A1  Nov. 3, 2022

(30) Foreign Application Priority Data

Sep. 26, 2019 (CN) .......................... 201910916740.2

(51) Int. Cl.
| | |
|---|---|
| A23J 3/16 | (2006.01) |
| A23J 3/34 | (2006.01) |
| A23L 27/21 | (2016.01) |
| A23L 27/50 | (2016.01) |
| C07K 1/34 | (2006.01) |
| C12P 21/06 | (2006.01) |

(52) U.S. Cl.
CPC ................. *A23J 3/16* (2013.01); *A23J 3/346* (2013.01); *A23L 27/215* (2016.08); *A23L 27/50* (2016.08); *C07K 1/34* (2013.01); *C12P 21/06* (2013.01)

(58) Field of Classification Search
CPC .... A23J 3/16; A23J 3/346; C07K 1/34; C12P 21/06; A23L 27/21; A23V 2002/00
See application file for complete search history.

(56) References Cited

U.S. PATENT DOCUMENTS 9,034,402 B2 * 5/2015 Wong ...................... A23L 11/65
426/656

FOREIGN PATENT DOCUMENTS

| CN | 106509801 | 3/2017 |
| CN | 109380701 | 2/2019 |
| CN | 110628855 | 12/2019 |

* cited by examiner

*Primary Examiner* — Lynn Y Fan
(74) *Attorney, Agent, or Firm* — JMB Davis Ben-David

(57) ABSTRACT

A preparation method for the high-clarity soybean flavor peptide comprises the following steps: mixing soybean and/or soybean meal with water and performing colloid milling to obtain a soybean protein slurry; adding protease and cellulase, performing filtering when hydrolysis degree reaches 10-15%, and then performing separation by a separator to obtain intermediate clear liquid which is soybean flavor peptide liquid, wherein the protease consists of papain and flavourzyme; adjusting a pH value of soybean flavor peptide liquid to 4.2-4.5, performing concentration under reduced pressure in vacuum, and performing heat preservation at 45-50° C. for 2-3 hours; performing filtration, heating a filtrate to 90° C., performing heat preservation for 1.0-1.5 hours, and performing spray-drying to obtain the high-clarity soybean flavor peptide. The method uses the flavourzyme to release a hydrophobic group in a soybean protein, then promotes occurrence of proteoid reaction and accelerates aggregation of the hydrophobic group.

6 Claims, 2 Drawing Sheets

HIGH-CLARITY SOYBEAN FLAVOR PEPTIDE, PREPARATION METHOD THEREFOR, AND USE THEREOF

CROSS-REFERENCE TO RELATED APPLICATION

This is the U.S. National Stage of International Patent Application No. PCT/CN2020/106686 filed on Aug. 4, 2020, which claims priority to Chinese Patent application Ser. No. 20/191,0916740.2 filed on Sep. 26, 2019.

TECHNICAL FIELD

The present invention relates to a deep processing technology for soybean protein, specifically relates to a high-clarity soybean flavor peptide and preparation method therefor and use thereof.

BACKGROUND

As an embodier and a blender of food flavor, condiments play an increasingly important role in table culture, and are concerned and loved by people day by day. With an improvement of people's living standards and a change in a dietary structure, people's demand for condiments also tends to be natural and healthy. Flavor peptides can not only provide basic tastes such as sour, sweet, bitter, salty, and umami tastes, but also participate in and affect the formation of food flavors, increase food flavors, improve food texture, and make an overall taste of food harmonious, delicate or mellow and rich, etc. Therefore, flavor peptide is one of the important base materials for high-grade compound condiments as well as flavors and fragrances.

At present, the preparation methods for flavor peptides mainly include an extraction method, a synthesis method and an enzymatic hydrolysis method. Wherein, it is difficult to achieve a large-scale production for the extraction method and the synthesis method due to the problems of costs and reagent residue, while the enzymatic hydrolysis method has become a common method for preparing flavor peptides due to the advantages of mild production conditions, controllable processes and safety.

The raw material for preparing flavor peptides is protein. Through a specific action of proteases, the flavor peptides and flavor amino acids hidden inside the protein are released, so that an enzymatic hydrolysate of protein has exhibited excellent flavor characteristics. However, due to the complex structure of protein, it is difficult for the protease having mild action to completely hydrolyze a macromolecular protein into small molecular peptides or amino acids. Proteins and macromolecular peptides may flocculate and precipitate under acidic conditions (near the isoelectric point). In addition, during the enzymatic hydrolysis process, hydrophobic peptides and amino acids inside protein are also exposed, and these hydrophobic groups may aggregate and flocculate in a food system, thus affecting an application effect, especially limiting their use in high-salt and high-acid foods or condiments (soybean sauce, vinegar and the like).

Soybean is one of the important cereal crops in China, and soybean meal is a by-product of extracting soybean oil with huge yield. Contents of glutamic acid and aspartic acid in soybean protein are relatively high, which are all high-quality bulk protein resource for preparing flavor peptides. However, soybean protein contains a large amount of hydrophobic amino acids, After hydrolyzing via the protease, these hydrophobic groups may inevitably aggregate during storage or use, resulting in insoluble aggregates, which will not only affect the appearance of food, but also reduce bioavailability and trophism, greatly limiting the application of soybean flavor peptide in food, especially the high-acid and high-salt food.

SUMMARY

In order to overcome a difficulty of limited use of an existing soybean flavor peptide solution in the high-salt and high-acid food or condiment due to turbidity, a primary object of the present invention is to provide a preparation method for a high-clarity soybean flavor peptide, which combines processes of a deep enzymatic hydrolysis and a concentrating under reduced pressure, releases the hydrophobic amino acids of soybean protein to the maximum extent on the basis of releasing flavor peptides, and accelerates the aggregation of hydrophobic amino acids, which is beneficial to the formation and removal of precipitates.

Another object of the present invention is to provide a soybean flavor peptide prepared by the above-described method.

Still another object of the present invention is to provide a use of the above-described soybean flavor peptide in a high-salt and high-acid food or condiment.

Objects of the present invention are realized by the following technical solutions:

A preparation method for a soybean flavor peptide comprises the following steps:

(1) mixing a soybean and/or soybean meal with water, maintaining a temperature at 50-60° C. and stirring for several hours, and passing through a colloid mill to obtain a soybean protein slurry;

(2) adding a protease and a cellulase into the soybean protein slurry, hydrolyzing at 50-60° C., filtering when a degree of hydrolysis reaches 10%-15%, with a filtrate being an enzymatic hydrolysate of the soybean protein; and then separating with a separator, getting rid of an upper layer of oil and a bottom layer of dreg to obtain an intermediate clear liquid of a soybean flavor peptide liquid, wherein, taking a mass of a solid content in the soybean protein slurry as a calculation basis, an adding amount of the protease accounts for 0.8%-1.6%, and an adding amount of the cellulase accounts for 0.5%-0.8%; and (3) adjusting a pH value of the soybean flavor peptide liquid to 4.2-4.5, concentrating under reduced pressure in vacuum at 55-65° C., adjusting a pH value of a system to near an isoelectric point for the soybean protein during concentrating the enzymatic hydrolysate of the soybean, which may contribute to a precipitation of an undegraded protein or a macromolecular peptide and generate a precipitate, be beneficial for subsequent separation, and better dissolve the soybean flavor peptide in a high-salt and high-acid solution;

when a solid content of the soybean peptide liquid reaches 35%-45%, eliminating vacuum, stopping agitation, maintaining the temperature at 45-50° C. for 2-3 hours to give rise to a plastein reaction; and filtering, subjecting a filtrate to enzyme deactivation and sterilization, and then spray drying, to obtain a high-clarity soybean flavor peptide.

The protease in the step (2) consists of a papain and a flavourzyme, and an activity unit ratio of the papain to the flavourzyme is (3-5):1.

The filtering in the step (2) is carried out by using a filter having a filtration pore of 400-600 meshes.

The separator in the step (2) is a three-phase separator, which can separate oil phase, water phase and solid phase.

The adjusting the pH value of the soybean flavor peptide liquid in the step (3) is carried out by using a citric acid or hydrochloric acid solution.

The filtering in the step (3) is carried out by using a filter with a filtration pore of 5-10 μm.

The subjecting the filtrate to enzyme deactivation and sterilization in the step (3) is heating for raising the temperature to 90° C., and maintaining the temperature for 1.0-1.5 hours.

The heating is carried out by using a heat exchanger; the heat exchanger may be a plate type heat exchanger or a tubular heat exchanger, and can rapidly raise the temperature of the soybean flavor peptide liquid from 50-65° C. to 90° C.

The high-clarity soybean flavor peptide prepared by the above-described method may be used for a high-salt and high-acid food, and may also be used for enhancing an umami taste (improving the umami taste) of a condiment.

Relative to the prior art, the present invention has the following advantages and effects:

(1) On the premise of guaranteeing the release of target flavor peptides, the method of the present invention releases hydrophobic groups within the soybean protein by using the protease. After enzymolysis, concentrating is continued without sterilization, and then, an occurance of the plastein reaction is induced, an aggregation of hydrophobic groups is accelerated, and a generation of an insoluble matter is accelerated, by changing pH value and water content in the enzymatic hydrolysate of the soybean protein. The water-insoluble matter is efficiently removed in combination with a filter, and sterilization and enzyme deactivation are then carried out, so as to obtain a high-clarity soybean flavor peptide.

(2) The present invention uses a cysteinyl-based protease, a papain, as an endopeptidaxe of the soybean protein, exposing hydrophobic amino acid groups in the protein to a bigger extent. Furthermore, the papain plays roles within a extremely wide range with a most appropriate pH value of 6.0-7.0, and can still play a hydrolyzing role on the protein at a pH value of 3.0-9.5; and the papain plays roles at a most appropriate temperature of 55-65° C. Therefore, roles may still efficiently be played at the temperature (50-65° C.) during concentrating under reduced pressure in the process of the present invention, inducing the soybean flavor peptide liquid to give rise to the plastein reaction, further promoting formation of the insoluble matter.

(3) The present invention uses the flavourzyme as an auxiliary exopeptidase for hydrolyzing soybean protein, main function of which is to continue hydrolyzing some hydrophobic peptides into free hydrophobic amino acids. Since the moisture content in the soybean peptide concentrate is relatively low, the free hydrophobic amino acids having low solubility easily reach saturation and are precipitated, and act as crystal nuclei to promote the aggregation of hydrophobic groups in the soybean peptide concentrate to form the water-insoluble matter.

(4) The present invention has the advantages of simple process operation, high production efficiency, low production cost, and no pollution. The obtained soybean flavor peptide has high clarity, can be widely used in the fields of food and condiments, and especially has a superior application effect in a soybean sauce having a higher requirement on high clarity.

DETAILED DESCRIPTION OF EMBODIMENTS

Figure 1:
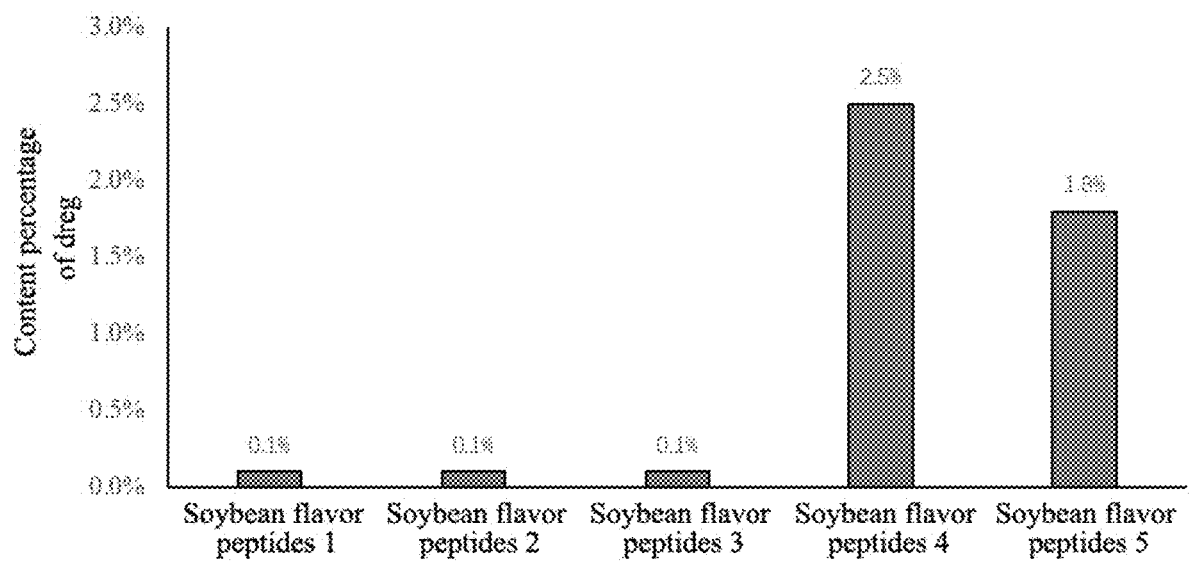
FIG. 1 is the solubility (content of dreg) of soybean flavor peptides in hydrochloric acid.

The present invention will be further described in detail below in combination with examples and drawings, but embodiments of the present invention are not limited thereto.

Experimental methods involved in examples of the present invention are as follows:

(1) Determination Method for a Salt Resistance and an Acid Resistance:

A solution of acid and salt having a pH value of 4.5 and a concentration of the salt of 20 g/mL is formulated by using lactic acid and an edible salt. 20 g of a sample is weighed, added into a clean beaker, and is dissolved by using hot water at 80° C., and the volume is determined to be 100 mL. 10 mL of the sample solution is then aspirated into 25 mL of the solution of acid and salt, and they are stirred uniformly, and shaken well after they are left to stand for 2 hours. 10 mL sample therefrom is taken into a 10 mL centrifuge tube, and is centrifuged at 8000×g for 5 min. A size of a precipitate is observed immediately, and a content of dreg (a volume ratio of a supernatant to a dreg) is recorded.

(2) Sensory Evaluation Method:

Experimental groups are prepared by taking 100 mL distilled water and adding 0.5 g monosodium glutamate as well as 0.1 g soybean flavor peptide respectively, and additionally, a control group is prepared by taking 100 mL distilled water and adding 0.5 g monosodium glutamate;

Experimental groups are prepared by taking 0.1 g soybean flavor peptide and adding 100 mL soybean sauce respectively, and additionally, a control group is prepared by taking 100 mL soybean sauce;

a sensory evaluation panel consists of 10 panelists (five men and five women, aged 25 to 35), who are very familiar with the five basic tastes (sour, sweet, bitter, salty, umami) and a feeling of satiety. A temperature in the sensory evaluation room is controlled at 23±2° C. The samples are evaluated by using a scoring method, giving a score ranging from 0 to 10, with 0 indicating that the tested sample has no taste, and 10 indicating that the sample has a significant taste. Control group is selected as a standard product, and scores for its umami taste, bitterness and satiety feeling are all 5 points. Different experimental groups are evaluated by scoring on the basis of these standard products.

Example 1

A preparation method for a high-clarity soybean flavor peptide comprises the following steps:

(1) mixing 1 part of soybean meal and 3 parts of water, raising a temperature to 50° C., maintaining the temperature and stirring for 3.0 hours, and then pulp grinding by a colloid mill to obtain a soybean protein slurry;
(2) adding a papain with a mass of its solid content of 1.2% and a flavourzyme with a mass of its solid content of 0.4%, as well as 0.5% of a cellulase into the soybean protein slurry, maintaining the temperature at 50° C. and hydrolyzing, separating via a filter with a filter cloth of 400 meshes when a degree of hydrolysis reaches 15%, collecting a filtrate to obtain an enzymatic hydrolysate of the soybean; performing centrifugal separation on the enzymatic hydrolysate of the soybean by using a three-phase disc stack separator, and getting rid of an upper layer of oil and a bottom layer of dreg to obtain an intermediate clear liquid being a soybean flavor peptide liquid; and
(3) adjusting a pH value of the soybean flavor peptide liquid to 4.5 by using a food-grade citric acid, and then concentrating under reduced pressure at a temperature of 65° C., eliminating vacuum when a solid content of the soybean flavor peptide liquid reaches 35%, stopping agitation, reducing the temperature to 45° C., standing still and maintaining the temperature for 2.0 hours; and then filtering by using a filter having a filtration pore of 5 μm, passing a filtrate through a heat exchanger to rapidly raise the temperature to 90° C., standing still and maintaining the temperature for 1.0 hour, and spray drying, to obtain a high-clarity soybean flavor peptide 1.

A result for a salt resistance and an acid resistance of the soybean flavor peptide 1 is seen from FIG. 1.

Figure 2:
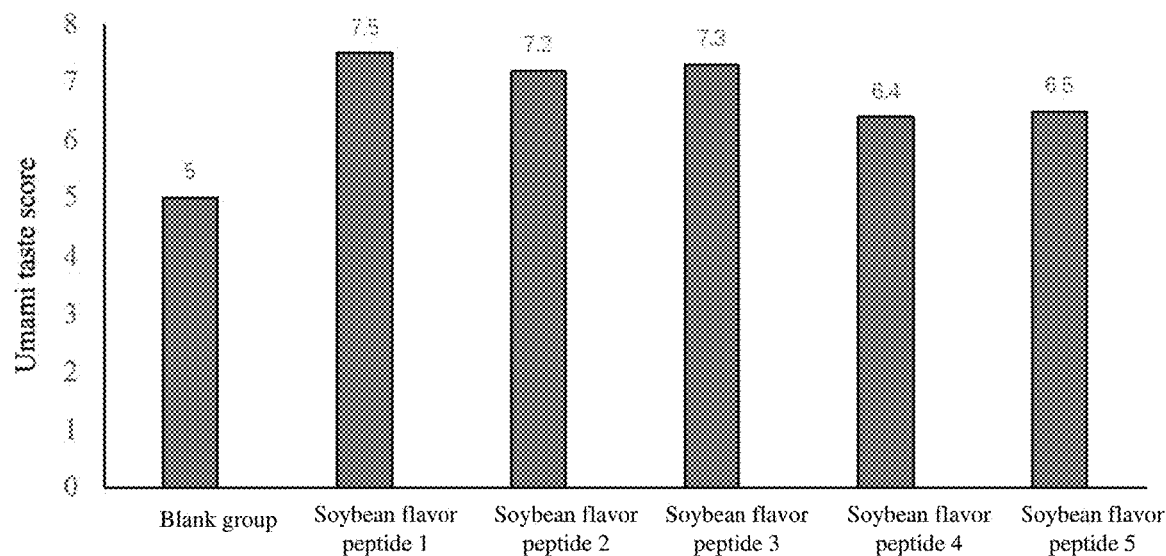
FIG. 2 is a promotion role of soybean flavor peptides on an umami taste of a monosodium glutamate; wherein, a blank group is for 0.5% monosodium glutamate, and other experimental groups are for 0.5% monosodium glutamate+ 0.1% soybean flavor peptide.

A result for enhancing an umami taste of a monosodium glutamate of the soybean flavor peptide 1 is seen from FIG. 2.

Figure 3:
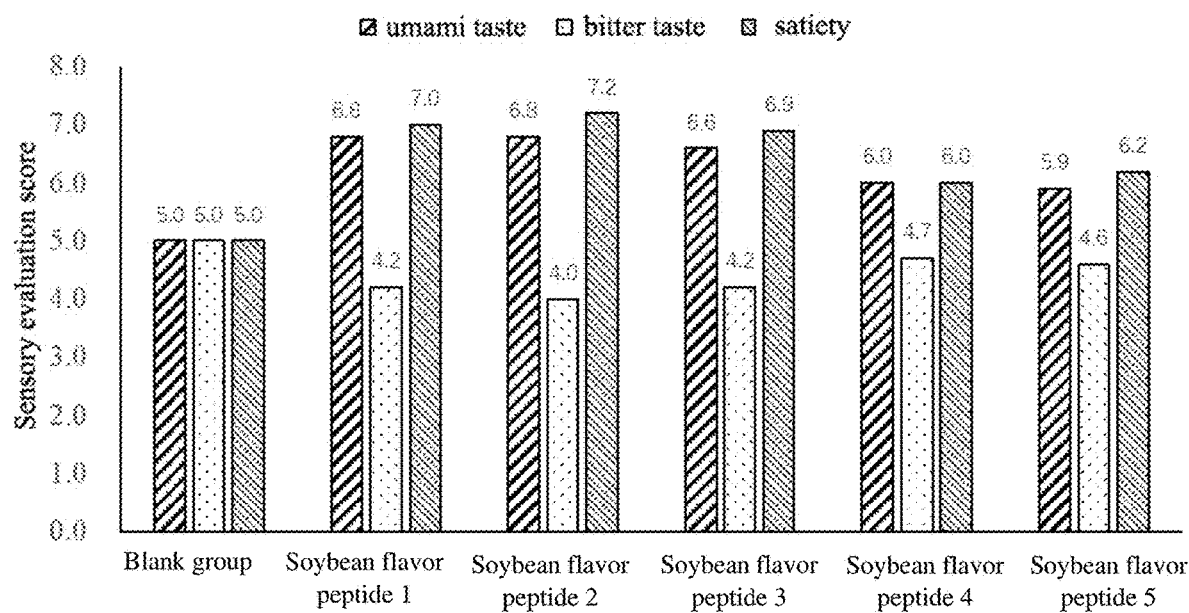
FIG. 3 is a promotion role of soybean flavor peptide on a flavor of a soybean sauce, wherein, a blank group is for soybean sauce, and other experimental groups are for soybean sauce+0.1% soybean flavor peptides.

A result for an effect on a flavor of a soybean sauce of the soybean flavor peptide 1 is seen from FIG. 3.

Example 2

A preparation method for a high-clarity soybean flavor peptide comprises the following steps:
(1) mixing 1 part of soybean meal with 5 parts of water, raising a temperature to 65° C., maintaining the temperature and stirring for 2.0 hours, and then pulp grinding by a colloid mill to obtain a soybean protein slurry;
(2) adding a papain with a mass of its solid content of 0.6% and a flavourzyme with a mass of its solid content of 0.2%, as well as 0.8% of a cellulose into the soybean protein slurry, hydrolyzing at 60° C., separating via a filter with a filter cloth of 600 meshes when a degree of hydrolysis reaches 10%, collecting a filtrate to obtain an enzymatic hydrolysate of the soybean; performing centrifugal separation on the enzymatic hydrolysate of the soybean by using a three-phase disc stack separator, and getting rid of an upper layer of oil and a bottom layer of dreg to obtain an intermediate clear liquid being a soybean flavor peptide liquid; and
(3) adjusting a pH value of the soybean flavor peptide liquid to 4.2 by using a hydrochloric acid solution, and then concentrating under reduced pressure at a temperature of 55° C., eliminating vacuum when a solid content of the soybean flavor peptide liquid reaches 45%, stopping agitation, reducing the temperature to 50° C., standing still and maintaining the temperature for 3.0 hours; and then filtering by using a filter having a filtration pore of 10 μm, passing a filtrate through a heat exchanger to rapidly raise the temperature to 90° C., standing still and maintaining the temperature for 1.5 hours, and spray drying, to obtain a high-clarity soybean flavor peptide 2.

A result for a salt resistance and an acid resistance of the soybean flavor peptide 2 is seen from FIG. 1.

A result for enhancing an umami taste of a monosodium glutamate of the soybean flavor peptide 2 is seen from FIG. 2.

A result for an effect on a flavor of a soybean sauce of the soybean flavor peptide 2 is seen from FIG. 3.

Example 3

A preparation method for a high-clarity soybean flavor peptide comprises the following steps:
(1) mixing 1 part of soybean with 4 parts of water, raising a temperature to 55° C., maintaining the temperature and stirring for 2.5 hours, and then pulp grinding by a colloid mill to obtain a soybean protein slurry;
(2) adding a papain with a mass of its solid content of 1.0% and a flavourzyme with a mass of its solid content of 0.2%, as well as 0.7% of a cellulose into the soybean protein slurry, hydrolyzing at 55° C., separating via a filter with a filter cloth of 500 meshes when a degree of hydrolysis reaches 12%, collecting a filtrate to obtain an enzymatic hydrolysate of the soybean; performing centrifugal separation on the enzymatic hydrolysate of the soybean by using a three-phase disc stack separator, and getting rid of an upper layer of oil and a bottom layer of dreg to obtain an intermediate clear liquid being a soybean flavor peptide liquid; and
(3) adjusting a pH value of the soybean flavor peptide liquid to 4.4 by using a citric acid, and then concentrating under reduced pressure at a temperature of 60° C., eliminating vacuum when a solid content of the soybean flavor peptide liquid reaches 40%, stopping agitation, reducing the temperature to 48° C., standing still and maintaining the temperature for 2.5 hours; and then filtering by using a filter having a filtration pore of 10 μm, passing a filtrate through a heat exchanger to rapidly raise the temperature to 90° C., standing still and maintaining the temperature for 1.5 hours, and spray drying, to obtain a high-clarity soybean flavor peptide 3.

A result for a salt resistance and an acid resistance of the soybean flavor peptide 3 is seen from FIG. 1.

A result for enhancing an umami taste of a monosodium glutamate of the soybean flavor peptide 3 is seen from FIG. 2.

A result for an effect on a flavor of a soybean sauce of the soybean flavor peptide 3 is seen from FIG. 3.

Comparative Example 1

A soybean flavor peptide is prepared by hydrolyzing a soybean meal using a conventional method (not the method of the present invention) comprising the following steps:
(1) mixing 1 part of soybean meal with 5 parts of water, raising a temperature to 65° C., maintaining the temperature and stirring for 2.0 hours, and then pulp grinding by a colloid mill to obtain a soybean protein slurry;
(2) adding a papain with a mass of its solid content of 0.6% and a flavourzyme with a mass of its solid content of 0.2%, as well as 0.8% of a cellulase into the soybean protein slurry, hydrolyzing at 60° C., raising a temperature to 90° C. when a degree of hydrolysis reaches 10%, maintaining the temperature for 30 minutes and performing enzyme deactivation, and then separating via a filter with a filter cloth of 600 meshes, collecting a filtrate to obtain an enzymatic hydrolysate of the soybean; performing centrifugal separation on the enzymatic hydrolysate of the soybean by using a three-phase disc stack separator, and getting rid of an upper layer of oil and a bottom layer of dreg to obtain an intermediate clear liquid being a soybean flavor peptide liquid; and (3) concentrating the soybean flavor peptide liquid at a temperature of 55° C. under reduced pressure, filtering by using a filter having a filtration pore of 10 μm after a solid content of the soybean flavor peptide liquid reaches 45%, passing a filtrate through a heat exchanger to rapidly raise the temperature to 90° C., standing still and maintaining the temperature for 1.5 hours, and spray drying, to obtain a high-clarity soybean flavor peptide 4.

A result for a salt resistance and an acid resistance the soybean flavor peptide 4 is seen from FIG. 1.

A result for enhancing an umami taste of a monosodium glutamate of the soybean flavor peptide 4 is seen from FIG. 2.

A result for an effect on a flavor of a soybean sauce of the soybean flavor peptide 4 is seen from FIG. 3.

Comparative Example 2

A soybean flavor peptide is prepared by hydrolyzing a soybean meal using a conventional method (not the method of the present invention) comprising the following steps:

(1) mixing 1 part of soybean meal with 5 parts of water, raising a temperature to 65° C., maintaining the temperature and stirring for 2.0 hours, and then pulp grinding by a colloid mill to obtain a soybean protein slurry;

(2) adding a papain with a mass of its solid content of 0.6% and a flavourzyme with a mass of its solid content of 0.2%, as well as 0.8% of a cellulase into the soybean protein slurry, hydrolyzing at 60° C., raising a temperature to 90° C. when a degree of hydrolysis reaches 10%, maintaining the temperature for 30 minutes and performing enzyme deactivation, and then separating via a filter with a filter cloth of 600 meshes, collecting a filtrate to obtain an enzymatic hydrolysate of the soybean; performing centrifugal separation on the enzymatic hydrolysate of the soybean by using a three-phase disc stack separator, and getting rid of an upper layer of oil and a bottom layer of dreg to obtain an intermediate clear liquid being a soybean flavor peptide liquid; and (3) adjusting a pH value of the soybean flavor peptide liquid to 4.2 by using a hydrochloric acid solution, and then concentrating under reduced pressure at a temperature of 55° C., when a solid content of the soybean flavor peptide liquid reaches 45%, filtering by using a filter having a filtration pore of 10 μm, passing a filtrate through a heat exchanger to rapidly raise the temperature to 90° C., standing still and maintaining the temperature for 1.5 hours, and spray drying, to obtain a high-clarity soybean flavor peptide 5.

A result for a salt resistance and an acid resistance of the soybean flavor peptide 5 is seen from FIG. 1.

A result for enhancing an umami taste of a monosodium glutamate of the soybean flavor peptide 5 is seen from FIG. 2.

A result for an effect on a flavor of a soybean sauce of the soybean flavor peptide 5 is seen from FIG. 3.

It can be seen from FIG. 1, that the soybean flavor peptides prepared by using the method of the present invention (the soybean flavor peptides 1, 2, and 3) still have a better solubility and clarity in a 20% of the salt solution having a pH value of 4.5, the contents of dreg of which are only around 0.1% (almost none) through a high-speed centrifugal separation (8000×g, 5 min).

However, the soybean flavor peptides prepared by using a conventional process or a part of process in the present invention have the contents of dreg up to 2.5% (Comparative Example 1) and 1.8% (Comparative Example 2).

Wherein, a difference between Comparative Example 1 and Comparative Example 2 is that, on the basis of the process of Comparative Example 1, Comparative Example 2 is added with the following features: after finishing subjecting the soybean protein to enzymolysis (enzyme deactivation), adjusting the pH value of the soybean flavor peptide liquid to 4.2 by using the hydrochloric acid solution, and then concentrating under reduced pressure at a temperature of 55° C. It is demonstrated by the results that, adjusting the pH value of a system to near an isoelectric point for the soybean protein during concentrating the enzymatic hydrolysate of the soybean in Comparative Example 2, may contribute to a precipitation of an undegraded protein or a macromolecular peptide and generate a precipitate, be beneficial for subsequent separation, and better dissolve the soybean flavor peptide in a high-salt and high-acid solution.

Processes of the present invention highly combines the enzymolysis process with the concentrating process, when the degree of hydrolysis of the soybean protein reaches a target value, concentrating is directly carried out. Due to no enzyme deactivation treatment before concentrating and a temperature for concentrating at 55-65° C., the protease during concentrating still continues to work. With a progress of concentrating, the concentration of the substrate gets higher, and adding the acid solution to change the acid environment in the system may induce a generation of the plastein reaction, to produce more water insoluble matter. Furthermore, due to a deep enzymolysis on the soybean protein at early stage, hydrophobic amino acids (such as tyrosine etc.) generated by hydrolyzing may aggregate the water insoluble matter to generate water insoluble matter in a form of big particle, which is beneficial for filtering and separating at later stage. Before filtering, the present invention separates out an insoluble component or a slightly soluble component in a water phase to a biggest extent and aggregates them, and the insoluble matter is separated out by a filtering process at the later stage to finally obtain a high-clarity soybean flavor peptide.

FIG. 2 is results of roles for enhancing an umami taste of a monosodium glutamate of soybean flavor peptides prepared according to Examples and Comparative Examples, the results demonstrate that the soybean flavor peptides prepared using the present invention all have better roles of enhancing umami taste on a monosodium glutamate, and the score for the umami taste of the monosodium glutamate can be promote from 5.0 points to 7.2 points or more with only an addition of 0.1%, while the soybean flavor peptide 4 and the soybean flavor peptide 5 of Comparative Example 1 and Comparative Example 2 can also promote the score of the umami taste of the monosodium glutamate to 6.4 points, demonstrating that using the protease (papain and flavourzyme) of the present invention can release a peptide for enhancing umami taste from the soybean flavor peptide, and the plastein reaction as well as the aggregation reaction of the hydrophobic peptide and the amino acid during the concentrating process of the present invention can further promote a content and a role of the peptide for enhancing umami taste.

FIG. 3 is results for the effect on the flavor of the soybean sauce of the soybean flavor peptides, demonstrating that adding 0.1% of the soybean flavor peptides in Examples and Comparative Examples can all obviously promote the umami taste and the satiety of the soybean sauce, and significantly bring down a bitter taste of the soybean sauce. It is demonstrated that, using the protease in the present invention can better release the flavor peptides in the soybean protein, playing roles of promoting the umami taste and the satiety of the soybean sauce, inhibiting the bitter taste, and the present invention can release and enrich such flavor peptides to a biggest extent. Therefore, the soybean flavor peptides of Examples (the soybean flavor peptides 1, 2, and 3) have the better flavor promotion role on the soybean sauce than the soybean flavor peptides of Comparative Examples (the soybean flavor peptides 4 and 5). It may thereby be seen that, the soybean flavor peptides prepared in the present invention are not only clear and transparent in a high-salt and high-acid food, can but also significantly promote the umami taste and the satiety of a food or condiment, and bring down a value of the bitter taste.

The above-described Examples are preferred embodiments of the present invention, but embodiments of the present invention are not limited by the above-described Examples, any other changes, modifications, substitutions, combinations, and simplifications made without departing from spirit as well as principle of the present invention should all be equivalent replacing modes, and all be contained in the protection scope of the present invention.

The invention claimed is:

1. A preparation method for a soybean flavor peptide, comprising:
   (1) mixing a soybean, soybean meal, or both with water, maintaining a temperature at 50-60° C. and stirring for several hours, and passing through a colloid mill to obtain a soybean protein slurry;
   (2) adding a protease and a cellulase into the soybean protein slurry, hydrolyzing at 50-60° C., filtering when a degree of hydrolysis reaches 10%-15%, with a filtrate being an enzymatic hydrolysate of the soybean protein; and then separating via a separator, getting rid of an upper layer of oil and a bottom layer of dreg to obtain an intermediate clear liquid being a soybean flavor peptide liquid;
   wherein an adding amount of the protease accounts for 0.8%-1.6% by weight of a solid content of the soybean protein slurry, and an adding amount of the cellulase accounts for 0.5%-0.8% by weight of the solid content of the soybean protein slurry; and
   the protease consists of a papain and a flavourzyme; and
   (3) adjusting a pH value of the soybean flavor peptide liquid to 4.2-4.5, concentrating under reduced pressure in vacuum at 55-65° C., when a solid content of the soybean peptide flavor liquid reaches 35%-45% by weight of the soybean peptide flavor liquid, eliminating vacuum, stopping agitation, maintaining the temperature at 45-50° C. for 2-3 hours; and filtering, subjecting a filtrate to enzyme deactivation and sterilization, and then spray drying, to obtain a high-clarity soybean flavor peptide.

2. The preparation method according to claim 1, wherein in the protease in the step (2), an activity unit ratio of the papain to the flavourzyme is 3:1 to 5:1.

3. The preparation method according to claim 1, wherein the filtering in the step (2) is carried out by using a filter having a filtration pore of 400-600 meshes.

4. The preparation method according to claim 1, wherein the filtering in the step (3) is carried out by using a filter with a filtration pore of 5-10 μm.

5. The preparation method according to claim 1, wherein subjecting the filtrate to enzyme deactivation and sterilization in the step (3) is heating for raising the temperature to 90° C., and maintaining the temperature for 1.0-1.5 hours.

6. The preparation method according to claim 5, wherein the heating is carried out by using a heat exchanger.

* * * * *